United States Patent
Veres

(10) Patent No.: US 8,175,059 B2
(45) Date of Patent: May 8, 2012

(54) BUFFER TRANSFER IN A COMMUNICATIONS NETWORK

(75) Inventor: Andras Veres, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 12/594,096

(22) PCT Filed: Mar. 30, 2007

(86) PCT No.: PCT/EP2007/053100
§ 371 (c)(1),
(2), (4) Date: Jan. 28, 2010

(87) PCT Pub. No.: WO2008/119384
PCT Pub. Date: Oct. 9, 2008

(65) Prior Publication Data
US 2010/0131664 A1    May 27, 2010

(51) Int. Cl.
*G06F 15/16* (2006.01)
(52) U.S. Cl. ......... 370/331; 370/338; 370/328; 370/330
(58) Field of Classification Search .................... 370/331
See application file for complete search history.

(56) References Cited

U.S. PATENT DOCUMENTS

| | | | |
|---|---|---|---|
| 6,188,906 B1 * | 2/2001 | Lim et al. | 455/453 |
| 6,292,652 B1 * | 9/2001 | Kim | 455/20 |
| 2005/0143072 A1 * | 6/2005 | Yoon et al. | 455/436 |
| 2007/0058587 A1 * | 3/2007 | Han et al. | 370/331 |
| 2009/0323630 A1 * | 12/2009 | Daoud-Triki et al. | 370/331 |

FOREIGN PATENT DOCUMENTS

EP    1 701 574 A    9/2006

OTHER PUBLICATIONS

Taleb T et al: "A dummy segment based bandwidth probing technique to enhance the performance of TCP over heterogeneous networks" Wireless Communications and Networking Conference, 2005 IEEE New Orleans, LA, USA, Mar. 13-17, 2005, Piscataway, NJ, USA, IEEE, Mar. 13, 2005.

* cited by examiner

*Primary Examiner* — Jeffrey Pwu
*Assistant Examiner* — Sulaiman Nooristany

(57) ABSTRACT

A method and apparatus for transferring buffer data from a first network node to a second network node during a mobile handover between cells. In order to improve the speed at which buffer data is transferred during a handover, a connection using a congestion control protocol is established between the two nodes prior to the handover. Dummy data is sent over this connection, in order to approach or reach the available data transfer rate, and at the handover, the dummy data is replaced with buffer data.

9 Claims, 4 Drawing Sheets

BUFFER TRANSFER IN A COMMUNICATIONS NETWORK

FIELD OF THE INVENTION

The invention relates to buffer transfer in a communications network.

BACKGROUND TO THE INVENTION

A cellular mobile access network is a radio network made up of a number of cells, each cell being served by a fixed transmitter. Cells are used to cover different areas in order to provide radio coverage over a wider area than the area of one cell.

As shown in FIG. 1, when a user with mobile equipment 101 moves between the areas covered by adjacent cells 102, 103, a handover must be performed between those cells. A connection between the mobile equipment 101 and the old cell 102 is broken, and a new connection between the mobile equipment 1 and a new cell 3 is established. The cells may comprise a Base Station, Radio Network Controller, or other similar device that has a downlink buffer. Data held in the downlink buffer at the old cell 102 must be transferred to the downlink buffer of the new cell 103.

In 3G networks, this is solved by a special procedure and signalling standardized by 3GPP. In current 3G networks the buffer transfer procedure is done infrequently only when the user moves between Radio Network Controllers (RNCs). In future Long Term Evolution (LTE) technology, it is planned that this procedure will be done frequently because the packets are stored in the Base Stations (BSs) 104, 105, as illustrated in FIG. 1, and will therefore be transferred between base stations during cell handover.

In mobile networks, when a cell change occurs, a buffer transfer may be required between the buffers of the involved base stations. Of course, the faster the transfer of buffer data between cells, the better and more "seamless" the user's experience will be. Possible solution for transferring data held in a buffer include possible solutions include User Datagram Protocol (UDP) or Transmission Control Protocol (TCP), but there are problems with using either of these protocols. Transport links will typically be shared between several base-station-to-base-station or base-station-to-anchor, etc. connections. Data traffic over the shared links may arrive from many different sources. It is therefore difficult to estimate the available capacity for a buffer transfer.

The easiest solution is to use standard UDP and burst the data to the target base station at a high rate. Unfortunately the correct rate of this burst is unknown and if it is not estimated correctly, there may be many losses in the transfer. Furthermore, this technique may cause congestion for other connections sharing the same path. If for example, the error in the available rate estimation is just 10%, it will cause approximately 10% loss for the transmitted buffer data. This is a high amount for end-user applications, and is very detrimental to the performance as perceived by the end-user.

TCP, Stream Control Transmission Protocol (SCTP), or custom congestion-controlled UDP may solve the problem of sending buffer data at too high a rate, but these protocols require a large data overhead, making them inefficient for transferring buffer data. To establish a TCP connection takes too long a time (at least 2 round-trip times are needed before the actual buffer data can be sent). Furthermore, TCP requires a slow-start in order to reach the correct rate of data transfer. The result is that the handover interruption time would be dominated by such overheads and not radio protocols. The time required to set up a connection and speed up data transfer to the available rate is between 28-535 ms, which is too large considering that the radio interruption should be of a shorter time.

An alternative solution is to use pre-established connections to save connection setup time. Keep-alive SCTP, TCP or custom congestion-controlled UDP solves the problem of the connection setup overhead, but when there is no data traffic for a period of time, assumptions made by these protocols about congestion is invalid and not within a guaranteed precision e.g., 10%. An implication of this is that there may be insufficient available capacity and packets may need to be re-transmitted, possibly causing long time-out and a slow-start. Furthermore, the Internet Engineering Task Force (IETF) suggests that if there is no traffic, the congestion window of TCP should be reduced to avoid overloading the available data paths. Again, this leads to the problem that a certain time needed to test for capacity starting from a low data transfer rate.

As shown in FIG. 2, using a TCP tunnel-based solution in a wireless emulation testbed shows that the speed of data transfer slows down considerably during handover, even though the radio handover time was set to zero ms (the data shown assumes a Round Trip Time, RTT, of 200 ms, and a transfer rate of 5 Mbps). The x-axis shows time and the y-axis shows cumulative number of bytes transmitted. It can be seen that the slow-down lasts for around 2 seconds The reason for the approximately 2 sec slow-down is that the transfer tunnel needs to test the available capacity to avoid Node-B-to-Node-B transport congestion.

SUMMARY

Current buffer transfer mechanisms are not able to guarantee seamless handover at high data transfer speeds. Unlike in 3G, in the case of LTE or even 4G, the buffer transfer mechanism becomes a bottleneck during high-speed data transfers.

According to the invention, between the base stations where buffer transfers may occur, a semi-continuous transport connection is maintained. This may be, for example, TCP or SCTP based. This connection is utilized whenever there is a need to perform buffer transfer. This way the time to establish a connection is eliminated (at least 2 round-trip times are otherwise required). Such connections are established and released on an on-demand basis, that is to say that if there is no buffer transfer between two base stations for some time, the connection is released.

If there is no traffic over this connection for some time, the transport protocol has no idea about the congestion state of the transport network, which would normally require measures such as additional extra round-trip times, possible retransmissions, losses, slow-start etc which are all detrimental to the performance of the network and the rate of data transfer between buffers. To avoid this, "dummy" packets are sent a short time before the buffer to buffer transfer starts. The dummy packets are sent with low priority, and their purpose is to continuously test the network for available capacity. The rate of the dummy packets on the application layer is preconfigured to maximize the occupied capacity of a single buffer transfer. A buffer transfer will therefore starts without data packet overheads, and at the maximum available rate. The dummy traffic has no or very little impact on real traffic.

According to a first aspect of the present invention, there is provided a method of transferring buffer data from a first network node to a second network node during a mobile handover between cells, the method comprising:

prior to transferring buffer data, establishing a communication channel between the first node and the second node, the communication channel using a congestion control protocol;

sending dummy data from the first node to the second node using the communication channel;

at the handover, transferring the buffer data from the first node to the second node by replacing the dummy data with buffer data.

The congestion control protocol may be selected from one of Transmission Control Protocol and Stream Control Transmission Protocol, although any suitable congestion control protocol may be used.

Once buffer data has been transferred, it may be desirable to send dummy data again to keep the channel open, in the event that further buffer data may need to be transferred. In this case, it is preferable to wait until all the buffer data has been transferred. Accordingly, the method may comprise receiving, at the first node, an acknowledgement that all buffer data has been transferred to the second node, and after receipt of the acknowledgement, sending dummy data from the first node to the second node.

In order to minimize the amount of dummy data sent, the method may comprise, prior to establishing the communication channel, determining when a buffer transfer will be required.

This determination may be made on the basis of a trigger, the trigger being selected from one of a degradation in radio quality, a measurement command, policy control, and cross-layer communication Where there are several possible nodes to which a possible handover may be directed, the method may comprise, prior to transferring buffer data, establishing a communication channel between the first node and a plurality of nodes, the plurality of nodes being possible target nodes for a handover. Once a target node has been selected for handover, the communications channel with the remaining nodes is closed.

To further minimize the amount of dummy data sent, the method of transferring buffer data may comprise comprising calculating a length of time required for the dummy data to reach a data transfer capacity, and establishing the communication channel between the first and second nodes the calculated time before the handover.

The time may be calculated on the basis of the sum of the time to establish the connection and the time to reach a data transfer rate capacity. The time to establish the connection may be calculated on the basis of the Round Trip Time. Furthermore, the time for the dummy data to reach a data transfer rate capacity is calculated on the basis of the Round Trip Time, the packet size, and the desired bitrate.

According to a second aspect of the invention, there is provided a node for use in a communications network, the node comprising a transmitter, the transmitter arranged to transmit dummy data prior to a handover of a user terminal between cells in a mobile communications network, and the transmitter arranged to transmit buffer data after a handover. The node also comprises a processor for scheduling transmission of dummy data and buffer data. The dummy data and buffer data is transmitted over a communication channel that uses a congestion control protocol;

The node may be selected from one of a Base Station and a Base Station Controller.

DETAILED DESCRIPTION

Figure 1:
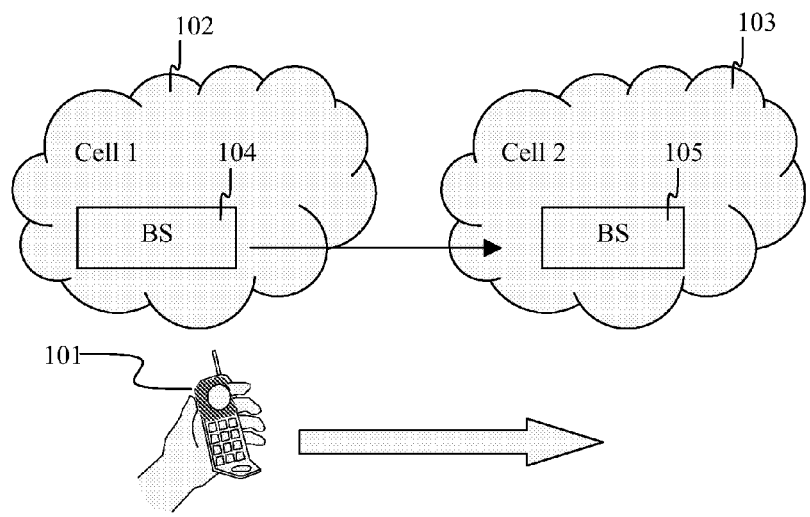
FIG. 1 illustrates schematically buffer transfer between two cells in a mobile network during handover.
Figure 2:
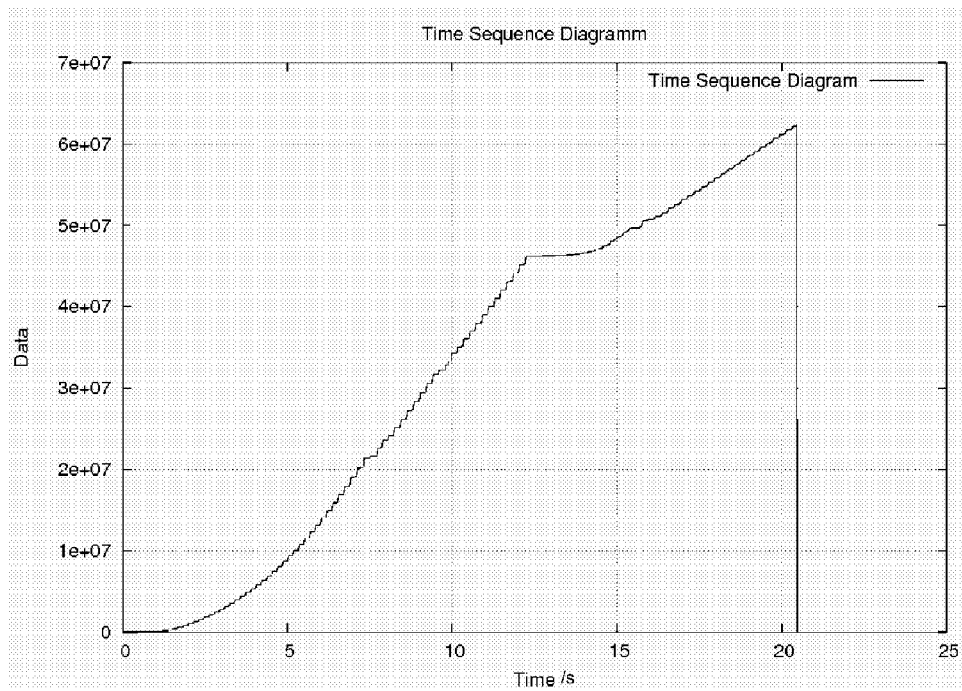
FIG. 2 is a graph illustrating the wireless emulation testbed data transfer with respect to time using a TCP based solution for buffer transfer.
Figure 3:
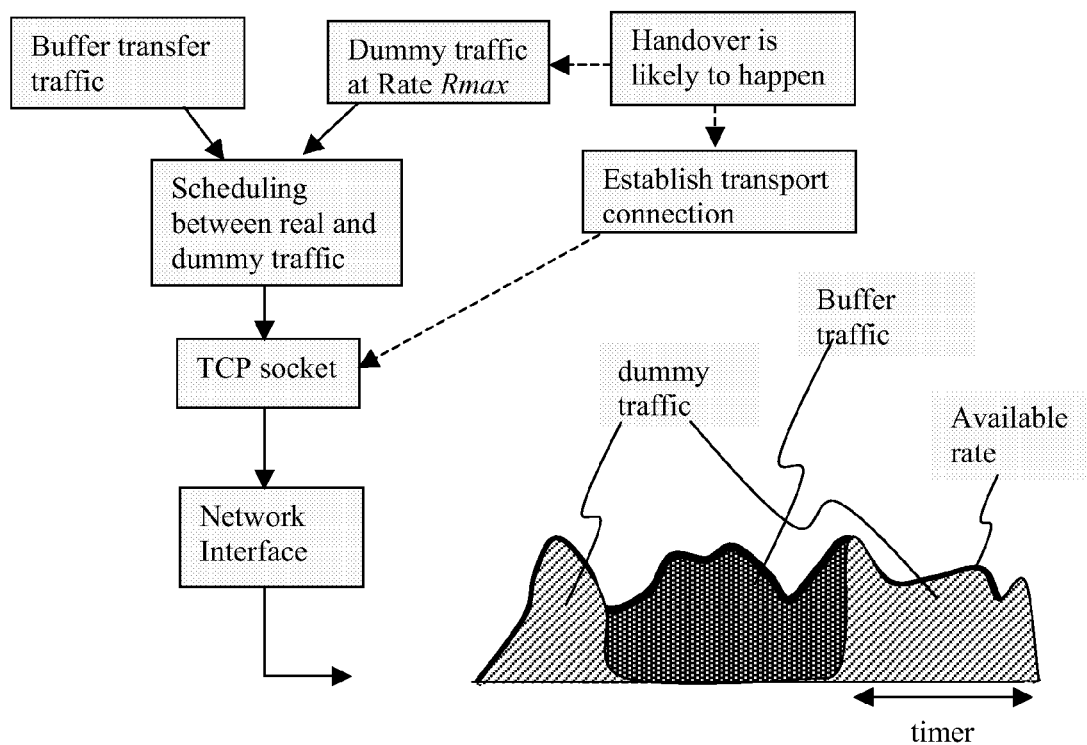
FIG. 3 shows a flow chart illustrating the basic steps of the invention.

A semi-continuous transport connection is maintained between two nodes that may be involved in a buffer transfer. When a handover between the nodes is likely to occur, as illustrated in FIG. 3, dummy data is sent over the connection to test the data transfer rate, and once the handover occurs the dummy data is replaced with actual buffer transfer data. Once the buffer transfer data has all been sent and acknowledged, dummy data is again sent over the connection to test the data transfer rate.

Figure 4:
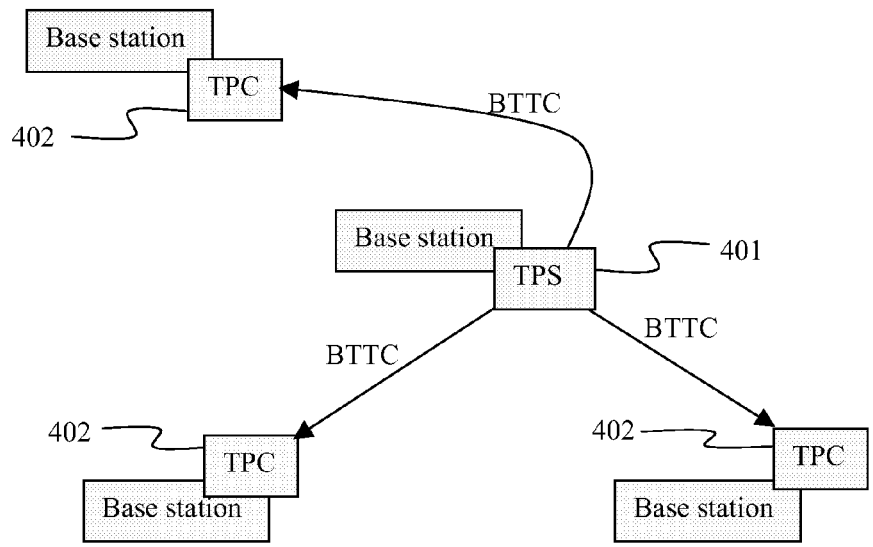
FIG. 4 illustrates schematically buffer transfer between base stations.

The invention requires the following components, as illustrated in FIG. 4:

A transport protocol server (TPS) 401 including a transport protocol stack, a rate-controlled dummy packet sender, a priority setter and buffer transfer control Transport protocol client (TPC) 402; and Transport network equipment with standard transport level priority mechanism enabled (e.g., DiffServ)

In a mobile communications network, each base station acts as a TPS as well as TPC entity. The buffer transfer transport connection established between selected base stations is called Buffer Transfer Transport Context (BTTC). A BTTC is defined by the following parameters:

TPS identifier (IP address)

TPC identifier (IP address)

Anchor identifier, if the transferred buffer data is tunnelled through an anchor.

Transport protocol type, which defines the transport protocol used. It can be either TCP, SCTP or any other transport protocol that uses congestion control and reliable transfer.

Dummy rate defines the traffic rate used by the TPS to send dummy packets. It is possible to set this rate as infinite and allow the BTTC transport protocol to regulate the rate. Preferably the dummy rate is set to several megabits/second to maintain a certain startup rate for buffer transfer.

Keep-alive timer, which defines how long the BTTC is kept where no buffer transfer data is sent between the TPS 401 and TPC 402.

Dummy DiffServ code point, which defines the diffserv code point used for the dummy packets. The code point defines a lower priority than the priority of the real buffer transfer data.

Buffer transfer data DiffServ code point defines the diffserv code point used for real data during buffer transfer. It may have the same value as regular user data, but may also be a special class put aside especially to ensure seamless handovers.

The TPS is responsible of maintaining a transport connection to the TPC. The used transport protocol can be configured or predefined, for example TCP or SCTP.

If there is no data stored in the downlink buffer, then BTTC is not established. If buffer transfer is starts and there is no BTTC present, a new BTTC is established by the TPC. This adds extra time to the initial handover, but the keep-alive timer is sufficiently large to keep the number of BTTC establishments low.

If all of the real buffer transfer data in a buffer transfer has been acknowledged, the keep-alive timer is started. If the timer expires without any new real transfer data being sent, the BTTC is released and sending of dummy packets is stopped.

To optimize the above-described process, when the radio access procedures determine that a user terminal is about to require a handover between cells, the BTTC is established as part of a handover preparation. Usually, there is sufficient time before the actual handover happens to establish the BTTC and speed up the dummy rate during this time. There are several signals that may be used as a trigger for BTTC establishment, for example radio quality degradation, measurement command, policy control, cross-layer communication etc. The time needed to speed up the BTTC is short, so the amount of dummy packets can be kept low.

In the case where the likely target cell has been identified before handover, then information is available about the likely target cell. The BTTC is established towards that cell and dummy traffic is only transmitted in that direction. For optimization reasons, this method is also applied it is determined statistically that certain targets or a particular target are more likely than others.

However, if there is no information on which cell will most likely be the new cell after a handover, then a BTTC is established and dummy packets are be transmitted to all neighboring cells or base stations which may be the recipient of the handover. Once the target cell has been identified, dummy traffic can be stopped to other cells or base stations.

Figure 5:
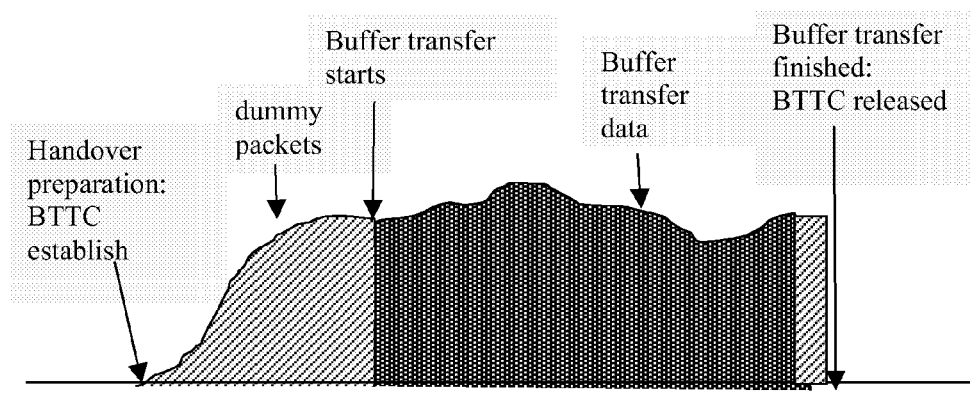
FIG. 5 illustrates schematically transfer rate of dummy packets and buffer transfer data.

FIG. 5 illustrates data transfer where BTTC is established as part of a handover preparation. In the initial period prior to a handover, dummy data is sent. The initial data transfer rate of dummy data is low, and the rate increases until the rate suitable for the capacity of the network is reached. At handover, the dummy data is replaced by real buffer transfer data. Because the rate suitable for the capacity of the network is known from sending the dummy data, the buffer transfer data is sent at the maximum suitable rate and does not require a slow-start mechanism. Once the handover has been completed and all of the buffer transfer data has been received and acknowledged at the new cell, the buffer transfer data is replaced by dummy data.

The following calculation is used to estimate the length of time prior to buffer transfer the BTTC should be established in order to reach the available data transfer capacity:

$$T_{speedup} = T_{connsetup} T_{slowstart} \quad (1)$$

where:

$T_{speedup}$ is the amount of time before buffer transfer that the BTTC is to be established;

$T_{connsetup}$ is the time to establish the BTTC connection; and $T_{slowstart}$ is the time for TCP or SCTP to reach the available data transfer rate capacity $T_{connsetup}$ is the time to set up a TCP or SCTP connection before data be carried over it. It is estimated that this time is about 2 round-trip times between the two base stations TPS and TPC:

$$T_{connsetup} = 2 * RTT_{TPS\text{-}TPC} \quad (2)$$

where $RTT_{TPS\text{-}TPC}$ is the round trip time between the TPS and the TPC.

$T_{slowstart}$ is calculated using the following equation:

$$T_{slowstart} = RTT_{TPS\text{-}TPC} * \log_2(R/8/P_{size} * RTT_{TPS\text{-}TPC}) \quad (3)$$

where R is the bitrate to achieve, and Psize is the packet size.

The table below shows the total time required to speed up at different rates and RTT.

| | RTT between TPS and TPC (sec) | | | | |
|---|---|---|---|---|---|
| Rate (bps) | 0.01 | 0.02 | 0.03 | 0.04 | 0.05 |
| 1000000 | 0.0287 | 0.0683 | 0.1142 | 0.1646 | 0.2185 |
| 5000000 | 0.0437 | 0.1044 | 0.1726 | 0.2457 | 0.3224 |
| 10000000 | 0.0522 | 0.1229 | 0.2010 | 0.2841 | 0.3708 |
| 20000000 | 0.0614 | 0.1420 | 0.2302 | 0.3232 | 0.4199 |
| 100000000 | 0.0840 | 0.1878 | 0.2991 | 0.4154 | 0.5353 |

If the BTTC is established and dummy transfer commences earlier than the numbers in the previous table, then the buffer transfer can happen in an optimal way.

When there is buffer content to transfer, the TPS tunnels the buffer data through the established connection with the Diff-Serv code-point configured for buffer transfer data. During the tunnelling of data, no dummy packets are sent by the TPS application. There may be some dummy packets in the transport protocol socket stored waiting for transmission or acknowledgement. As an optional optimization, the dummy packets that have not been transmitted can be deleted at this point.

When the last packet of the buffer transfer has been sent and acknowledged, the transfer of dummy packets starts again. Waiting for the acknowledgement is necessary in order to prevent the sending of dummy packets that might interfere with the buffer transfer.

When there is no buffer data to send, the TPS sends dummy packets with a rate limit configured and the dummy DiffServ code point. The rate limit is optional and it can be used to limit the amount of dummy traffic. The rate limit is also used to maintain a certain desired congestion window so that a buffer transfer after an idle period should work at the desired rate if capacity is available in the network.

Figure 6:
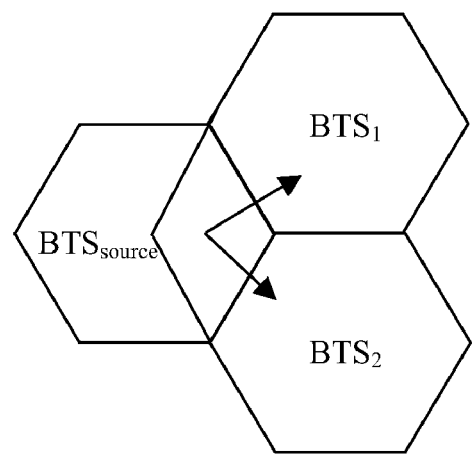
FIG. 6 illustrates schematically three adjacent base stations.

An example calculation is shown below that estimates the dummy traffic load:

Assumptions:

LTE Base transceiver Station (BTS) with 3 sectors and 800 subscribers/sector, as shown in FIG. 6.

The amount of traffic generated by a subscriber during a busy hour is estimated to be 14 kbps (10% laptop users with 10 Gbyte/month and 90% handheld users with 1 Gbyte/month)

A handover happens every 60 s on average

A cell has 2-3 neighbor BTSs with possibly several more potential target cells/sectors BTSs are 20 ms round-trip away from each other Average subscriber throughput of >1 Mbps during activity Average end-to-end round-trip time: 100 ms, so the average bandwidth delay product is 12.5 kbyte at 1 Mbps and 125 kbyte at 10 Mbps Calculation Average subscriber activity ratio is less than 14 kbps/1 Mbps=1.4%

Maximum number of subscribers with buffered data per sector: 800*1.4%~12

Average number of handovers per second with buffer transfer that require BTTC establishment is less than: 12/60=0.2

Due to slow-start of BTTC establishment, 2*BDP (buffer-delay product) needs to be transferred as dummy traffic to reach BDP. Assuming a BDP for transfer of 10 Mbps*20 ms (BTSs are 20 ms apart), this is 200 kbit.

Average amount of dummy traffic from a sector is thus: 200 kbit*12/60 sec=40 kbps.

Because the BTTC needs to be transferred to all neighboring BTSs from a sector (assuming 2-3 neighboring BTS), the total dummy traffic is 80-120 kbps per sector.

The total traffic per sector is 800*14 kbps=11.2 Mbps, so the ratio of dummy traffic to real traffic is: 0.7-1%.

If assumptions change, the results also change accordingly.

Figure 7:
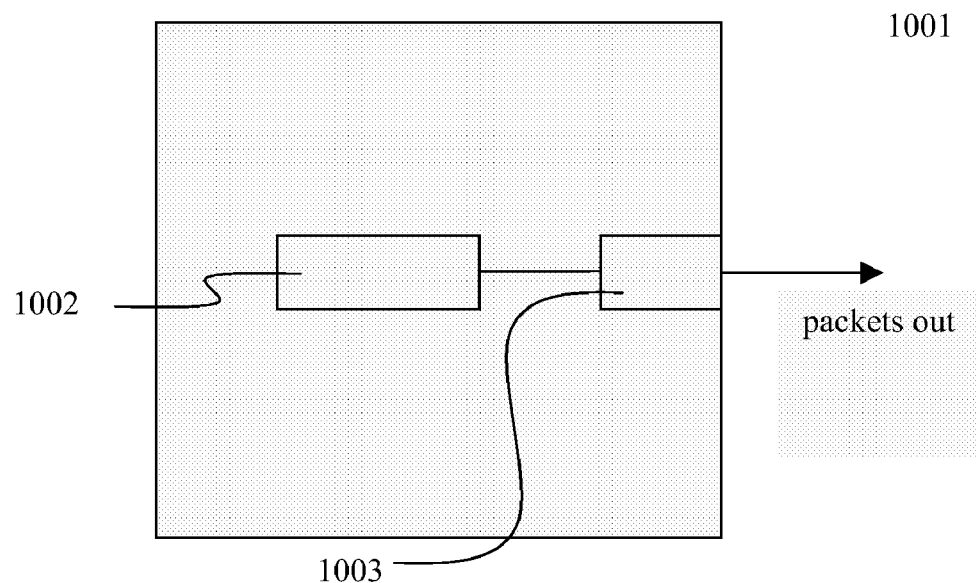
FIG. 7 illustrates schematically a network node according to the present invention.

In FIG. 7 a network node 1001 is illustrated for use in a radio access network cell. The network node 1001 comprises a processor 1002 for generating dummy packets and scheduling the sending of dummy data packets and buffer data packets. A transmitter 1003 is also provided for sending the dummy data packets and the buffer data packets to another node. The network node in a radio access network is typically a Base Station.

Using the invention, the TCP connection overhead does not impact buffer transfer; as data packets can be forwarded without delay. Compared to an alternative solution of starting a TCP connection when a buffer transfer is required, the speed-up time of 28-535 ms can be eliminated.

Compared to the alternative solution when TCP is pre-established but kept idle the speed-up time is less, approximately 8-435 ms, but the proposed invention starts data transfer immediately at high rate.

Compared to the alternate solution when UDP bursts or an opened window idle TCP connection is used (an opened window idle TCP connection allows TCP speed to be artificially increased), congestion due to bursts is eliminated, as are timeouts and unnecessary retransmissions of data.

The dummy traffic is estimated to be approximately 0.7-1% of the subscriber traffic.

The invention does not require a new transport protocol. TCP or SCTP can be used without changes. Furthermore, the networking devices between the two base stations can be off-the-shelf routers and switches with priority handling capabilities.

Even though the overall load on the network is increased using the invention, the increased load is controlled because the dummy traffic is rate limited. Furthermore, dummy traffic is only sent for a short time of around 60-600 ms, and the load due to dummy traffic is negligible especially because it is sent at low priority. In case of processor congestion, dummy packets may be dropped to avoid impact on real traffic. Real data traffic is not impacted because dummy traffic is sent at low priority.

It will be appreciated by the person of skill in the art that various modifications may be made to the above described embodiments without departing from the scope of the present invention. for example, the invention has been described with reference to LTE networks, although it will be appreciated that the invention may equally apply to other types of communications network where connections may change dynamically and the transport network is shared with unknown traffic. This is typically the case for packet switched networks.

The invention claimed is:

1. A method, in a cellular network, of maximizing transfer of buffer data from a first Base Station to a second Base Station during a mobile handover between cells, the method comprising:

prior to transferring buffer data, establishing a communication channel between the first Base Station and the second Base Station, the communication channel using a congestion control protocol;

sending dummy data from the first Base Station to the second Base Station using the communication channel;

calculating a length of time, based on a sum of the time to establish a connection and the time to reach a data transfer rate capacity required for the dummy data to reach the data transfer rate capacity establishing the communication channel between the first Base Station and the second Base Station at the calculated time before the handover; and at the handover, transferring the buffer data from the first Base Station to the second Base Station by replacing the dummy data with buffer data.

2. The method according to claim 1, wherein the congestion control protocol is selected from one of Transmission Control Protocol and Stream Control Transmission Protocol.

3. The method according to claim 1, the method further comprising:

receiving, at the first Base Station, an acknowledgement that all buffer data has been transferred to the second Base Station; and after receipt of the acknowledgement, sending dummy data from the first Base Station to the second Base Station.

4. The method according to claim 1, wherein, prior to establishing the communication channel, determining when a buffer transfer will be required.

5. The method according to claim 4, further comprising making said determination on the basis of a trigger, the trigger being selected from one of a degradation in radio quality, a measurement command, policy control, and cross-layer communication 6. The method according to claim 1, further comprising:

prior to transferring buffer data, establishing a communication channel between the first Base Station and a plurality of nodes, the plurality of Base Station being possible target Base Station for a handover; and once a target Base Station has been selected for handover, closing the communications channel with the remaining Base Stations.

7. The method according to claim 1, wherein the time to establish the connection is calculated on the basis of the Round Trip Time.

8. The method according to claim 1, wherein the time for the dummy data to reach a data transfer rate capacity is calculated on the basis of the Round Trip Time, the packet size, and the desired bitrate.

9. A first Base Station for use in a mobile communications network, the first Base Station comprising:

a transmitter, the transmitter arranged to transmit dummy data prior to a handover of a user terminal between cells in the mobile communications network, timing means for calculating a length of time, based on a sum of the time to establish a connection and the time to reach a data transfer rate capacity required for the dummy data to reach the data transfer rate capacity;

means for establishing the communication channel between the first Base Station and a second Base Station at the calculated time before the handover, and the transmitter arranged to replace the dummy data with buffer data after the handover; and a microprocessor with an associated memory storing instructions for scheduling transmission of the dummy data and the buffer data.

* * * * *

UNITED STATES PATENT AND TRADEMARK OFFICE
CERTIFICATE OF CORRECTION

PATENT NO. : 8,175,059 B2  Page 1 of 1
APPLICATION NO. : 12/594096
DATED : May 8, 2012
INVENTOR(S) : Veres It is certified that error appears in the above-identified patent and that said Letters Patent is hereby corrected as shown below:

In the Specification:

In Column 1, Line 9, delete "TO" and insert -- OF --, therefor.

In Column 2, Line 28, delete "seconds" and insert -- seconds. --, therefor.

In Column 5, Line 53, delete "$T_{connsetup}T_{slowstart}$" and insert -- $T_{connsetup}+T_{slowstart}$ --, therefor.

In the Claims:

In Column 8, Line 8, delete "capacity" and insert -- capacity; --, therefor.

Signed and Sealed this
Tenth Day of September, 2013

Teresa Stanek Rea
*Acting Director of the United States Patent and Trademark Office*